United States Patent
Tombari et al.

(10) Patent No.: US 9,495,607 B2
(45) Date of Patent: Nov. 15, 2016

(54) DESCRIBING OBJECTS USING EDGE-PIXEL-FEATURE DESCRIPTORS

(71) Applicant: Datalogic IP Tech S.R.L., Lippo di Calderara di Reno (IT)

(72) Inventors: Federico Tombari, Domagnano (SM); Alessandro Franchi, Arezzo (IT); Luigi Di Stefano, Bologna (IT)

(73) Assignee: Datalogic IP Tech S.r.l., Calderara Di Reno, Bologna (IT)

( * ) Notice: Subject to any disclaimer, the term of this patent is extended or adjusted under 35 U.S.C. 154(b) by 0 days.

(21) Appl. No.: 14/761,967

(22) PCT Filed: Jan. 21, 2013

(86) PCT No.: PCT/IT2013/000020
§ 371 (c)(1),
(2) Date: Jul. 20, 2015

(87) PCT Pub. No.: WO2014/111961
PCT Pub. Date: Jul. 24, 2014

(65) Prior Publication Data
US 2015/0363663 A1   Dec. 17, 2015

(51) Int. Cl.
| | | |
|---|---|---|
| G06K 9/00 | (2006.01) | |
| G06K 9/46 | (2006.01) | |
| G06K 9/48 | (2006.01) | |
| G06K 9/32 | (2006.01) | |
| G06K 9/62 | (2006.01) | |

(52) U.S. Cl.
CPC ........... *G06K 9/4633* (2013.01); *G06K 9/3241* (2013.01); *G06K 9/3275* (2013.01); *G06K 9/4642* (2013.01); *G06K 9/48* (2013.01); *G06K 9/6204* (2013.01)

(58) Field of Classification Search
None
See application file for complete search history.

(56) References Cited

U.S. PATENT DOCUMENTS

| | | | | |
|---|---|---|---|---|
| 4,876,728 A | * | 10/1989 | Roth | G06K 9/34 348/94 |
| 2008/0107345 A1 | | 5/2008 | Melikian | |
| 2012/0099796 A1 | | 4/2012 | Zitnick | |
| 2013/0223737 A1 | * | 8/2013 | Anbai | G06K 9/4671 382/170 |

OTHER PUBLICATIONS

Huet, B., et al., "Line Pattern Retrieval Using Relational Histograms," IEEE, Piscataway, NJ, USA, vol. 21, No. 12, Dec. 1999.

(Continued)

*Primary Examiner* — Eueng-Nan Yeh
(74) *Attorney, Agent, or Firm* — Dentons US LLP

(57) ABSTRACT

During a description technique (100), a local descriptor for an object (300) is generated (122) by computing a 2-dimensional histogram (600) of pairs of angles (514, 516) between pairs of line segments (510, 512) that are aligned with edge pixels associated with the object (300). The pairs of line segments (510, 512) belong to a subset of k neighboring or proximate line segments (310). Moreover, this 2D histogram (600) may represent the relative displacement and the relative orientations of the pairs of line segments (510, 512) in the subset as weights in bins or cells defined by angular quantization values, and the 2D histogram (600 may exclude lengths of the line segments. Subsequently, the generated 2D histogram (600) may be compared (210) to predefined sets of descriptors in a model library that are associated with a set of objects, and the object may be identified (212) as one of the set of objects based on a group of match scores determined in the comparisons.

21 Claims, 9 Drawing Sheets

(56) References Cited

OTHER PUBLICATIONS

Bray, Alistair, J., "Properties of Local Geometric Constraints," Procedings of the British Machine Vision Conference, Jan. 1991.
Rao, A.R., et al., "Computing Oriented Texture Fields," Computer Vision and Pattern Recognition, 1989, IEEE Computer Society Conference, San Diego, CA, USA, Jun. 1989.
Biswas, Soma., et al., "Exploring Ridge Curvature for Fingerprint Indexing," Biometrics: Theory, Applications and Systems, 2008, 2nd IEEE International Conference, Piscataway, NJ, USA, Sep. 29, 2008.
Evans, Alun C., et al., "The Use of Geometric Histograms for Model-Based Object Recognition," Procedings of the British Machine Vision Conference, Jan. 1993.
International Search Report, PCT/IT2013/000020, Oct. 14, 2013.

* cited by examiner

DESCRIBING OBJECTS USING EDGE-PIXEL-FEATURE DESCRIPTORS

CROSS REFERENCE TO RELATED APPLICATIONS

This application is a 371 National Stage Application of International Application No. PCT/IT2013/000020, filed Jan. 21, 2013, which is incorporated herein by reference in its entirety.

BACKGROUND

The present disclosure relates generally to object description. More specifically, the present disclosure relates to describing objects in images using descriptors based on features associated with edge pixels.

Object detection is among the most widely studied topics in computer vision. Techniques used for object detection or recognition from images usually have several characteristics, including: invariance to specific transformations (e.g., similarity transformations, affine transformations, etc.); robustness to photometric distortions and noise; computational efficiency; and, depending on the particular task, the ability to generalize to object categories. Many of the widely used existing object-detection techniques are based on descriptors. i.e., compact representations of local features in images, such as blobs, corners, and other types of salient regions extracted from images. These descriptors may be matched to an archival data structure (which is sometimes referred to as a 'model library') to detect objects.

In order for the existing object-detection techniques to be effective, there usually needs to be sufficient information on the object surface for features to be detected and accurately described. In particular, a sufficient amount of this information (which is henceforth referred to as 'texture') typically needs to be present in order for the features to be detected in a repeatable manner and to allow the informative features to be described. In addition, the texture often needs to be specific to each object so that successive matching and detection stages have discriminative power.

However, the performance of most existing descriptor-based object-detection techniques is often dramatically degraded with texture-less objects. In particular, the existing description techniques usually provide poor image descriptions and inaccurate matching for texture-less objects. This is a problem because texture-less objects are very common. For example, texture-less objects occur in many computer-vision tasks related to advanced manufacturing, such as visual inspection for process or quality control, as well as robot guidance. Another emerging application in which the objects of interest often may lack feature-rich surface texture is visual perception for service robotics, such as where personal robots interact with typical household materials. As a consequence, texture-less object detection is an active area of research in computer vision.

In contrast with the blob-like image regions in textured objects, the natural and distinctive features of texture-less objects are often edges and their geometric relations. Therefore, many proposed techniques for detecting texture-less objects involve edge-based template matching. In principle, these proposed object-detection techniques can seamlessly detect both textured and texture-less objects. However, the performance of the proposed objected-detection techniques is often degraded when there is significant occlusion and clutter. For example, if a proposed object-detection technique can tolerate a high degree of occlusion (i.e., a small fraction of matching edges has to be accepted in order to trigger detection), the resulting cue or feature is often not unique so that a large number of false detections occurs when the image is significantly cluttered.

In addition, it can also be difficult to scale the proposed objected-detection techniques to larger model libraries. In particular, while efficient search techniques, as well as careful hardware-related optimization, have been used to speed-up the look-up process, in general object detection usually involves matching a large set of views (as determined by the desired degree of pose invariance) for each sought object to the input image. Therefore, the search time often grows linearly with the size of the model library. As a consequence, when a relatively large pose space is explored, only a few models can usually be handled by the edge-based template matching in many proposed object-detection techniques.

SUMMARY

The disclosed embodiments relate to a computer system that generates one or more edge-based descriptors for an object. During operation, the computer system may optionally receive (or access) an image that includes the object, and may optionally extract line segments aligned with edge pixels associated with the object. Alternatively, the computer system may optionally receive the extracted line segments. Then, the computer system may determine orientations for the line segments. Moreover, the computer system may identify one or more subsets of the line segments, where a given subset includes k of the line segments that are proximate to a given line segment in the line segments. Next, the computer system may calculate pairs of angles representing relative displacement and relative orientation of pairs of line segments in the given subset. Note that a given pair of angles for a given pair of line segments in the given subset includes: a first angle at a location on a first line segment in the given pair of line segments between the first line segment and a second line segment in the given pair of line segments, and a second angle at a location on the second line segment between the second line segment and the first line segment. Furthermore, the computer system may generate the descriptor for the given subset by computing at least one 2-dimensional (2D) histogram of the pairs of angles between the pairs of line segments in the given subset based on cells defined by angular quantization values. Additional descriptors may be optionally generated by computing additional 2D histograms of the pairs of angles in other subsets, where a given 2D histogram corresponds to the pairs of angles in a particular subset.

In some embodiments, at least some of the line segments are not connected to (i.e., are de-coupled from) a remainder of the line segments.

Moreover, the orientations may be determined based on contrast polarity of the line segments. For example, an orientation of the given line segment may include a direction aligned with the given line segment, and a sign computed by taking a cross product of a gradient at the location on the given line segment and the direction.

Note that the k line segments in the given subset may be nearest neighbors to the given line segment.

In some embodiments, prior to determining the orientations, the computer system optionally filters the line segments based on lengths of the line segments and a threshold value.

Furthermore, the location on the first line segment and the location on the second line segment may include: midpoints of the first line segment and the second line segment; end points of the first line segment and the second line segment; and/or points on the first line segment and the second line segment separated by a minimum distance between the first line segment and the second line segment.

Note that calculating the given pair of angles may involve an operation other than calculating a dot product between the first line segment and the second line segment. For example, calculating the first angle may involve rotating the first line segment clockwise over a connecting line segment coupling the first line segment and the second line segment, and calculating the second angle may involve rotating the second line segment clockwise over the connecting line segment.

Additionally, for the given pair of angles, the at least one 2D histogram may include weights in neighboring, adjacent cells to a cell that includes the given pair of angles. The weights may be determined using bilinear interpolation, and a sum of the weights may equal a constant.

In some embodiments, the computer system optionally stores the at least one 2D histogram of the pairs of angles in a computer-readable memory that includes a set of descriptors of objects, where, for a given object, the set of descriptors includes at least one descriptor.

Moreover, the computer system may optionally generate a set of descriptors for the object by repeating at least some of the aforementioned operations for multiple images of the object from different vantage points. Alternatively or additionally, the computer system may optionally generate a set of descriptors for multiple subsets of the line segments in the object. Furthermore, the computer system may generate the set of descriptors by repeating at least some of the aforementioned operations for different values of k. In some embodiments, the computer system optionally compares the set of descriptors to a predefined set of descriptors associated with a second object. Then, the computer system may optionally identify the object as the second object based on a group of matches in the comparisons. Note that the object may be identified as the second object without using lengths of the line segments in the comparison.

Furthermore, the computer system may optionally associate at least a portion of the image with an object category based on an object classifier.

Alternatively or additionally, the computer system may optionally compare the one or more descriptors computed for the image to predefined sets of descriptors that are associated with a set of objects. Then, the computer system may optionally identify the object present in the image as one of the set of objects based on a group of match scores determined in the comparisons. Note that the comparing may involve: determining match scores between the one or more descriptors computed for the image and the predefined sets of descriptors based on Euclidean distances between the one or more descriptors and the predefined sets of descriptors; and selecting a subset of the matches based on the match scores using: a Generalized Hough Transformation and/or robust homography estimation.

In another embodiment, the computer system performs at least some of the aforementioned operations on other or additional geometric shapes (such as circular or elliptical arcs) aligned with the edge pixels associated with the object instead of or in addition to the line segments.

More generally, after optionally receiving the line segments or optionally extracting the line segments, the computer system may generate the at least one descriptor for the object by computing the at least one 2D histogram of the pairs of angles between the pairs of line segments that are aligned with the edge pixels associated with the object. Note that the at least one 2D histogram may represent the relative displacement and the relative orientations of the pairs of line segments, and the at least one 2D histogram may exclude lengths of the line segments.

In some embodiments, at least the descriptor is used in a pipeline for detecting an object or a pipeline for retrieving an object.

Another embodiment provides a method that includes at least some of the operations performed by the computer system.

Another embodiment provides a computer-program product for use with the computer system. This computer-program product includes instructions for at least some of the operations performed by the computer system.

Another embodiment provides an integrated circuit that performs at least some of the operations performed by the computer system. Therefore, this integrated circuit may be used in conjunction with or independently of the computer system.

For example, the integrated circuit may include an interface circuit that optionally receives the line segments or that optionally receives the image that includes the object, and an optional extraction circuit that optionally extracts the line segments aligned with the edge pixels associated with the object. Moreover, the integrated circuit may include an analysis circuit that: determines the orientations for the line segments; identifies the one or more subsets of the line segments, where the given subset includes k of the line segments that are proximate to the given line segment in the line segments; calculates the pairs of angles representing the relative displacement and the relative orientation of the pairs of line segments in the given subset; and generates the descriptor for the object by computing the at least one 2D histogram of the pairs of angles in the given subset based on the cells defined by the angular quantization values.

BRIEF DESCRIPTION OF THE DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
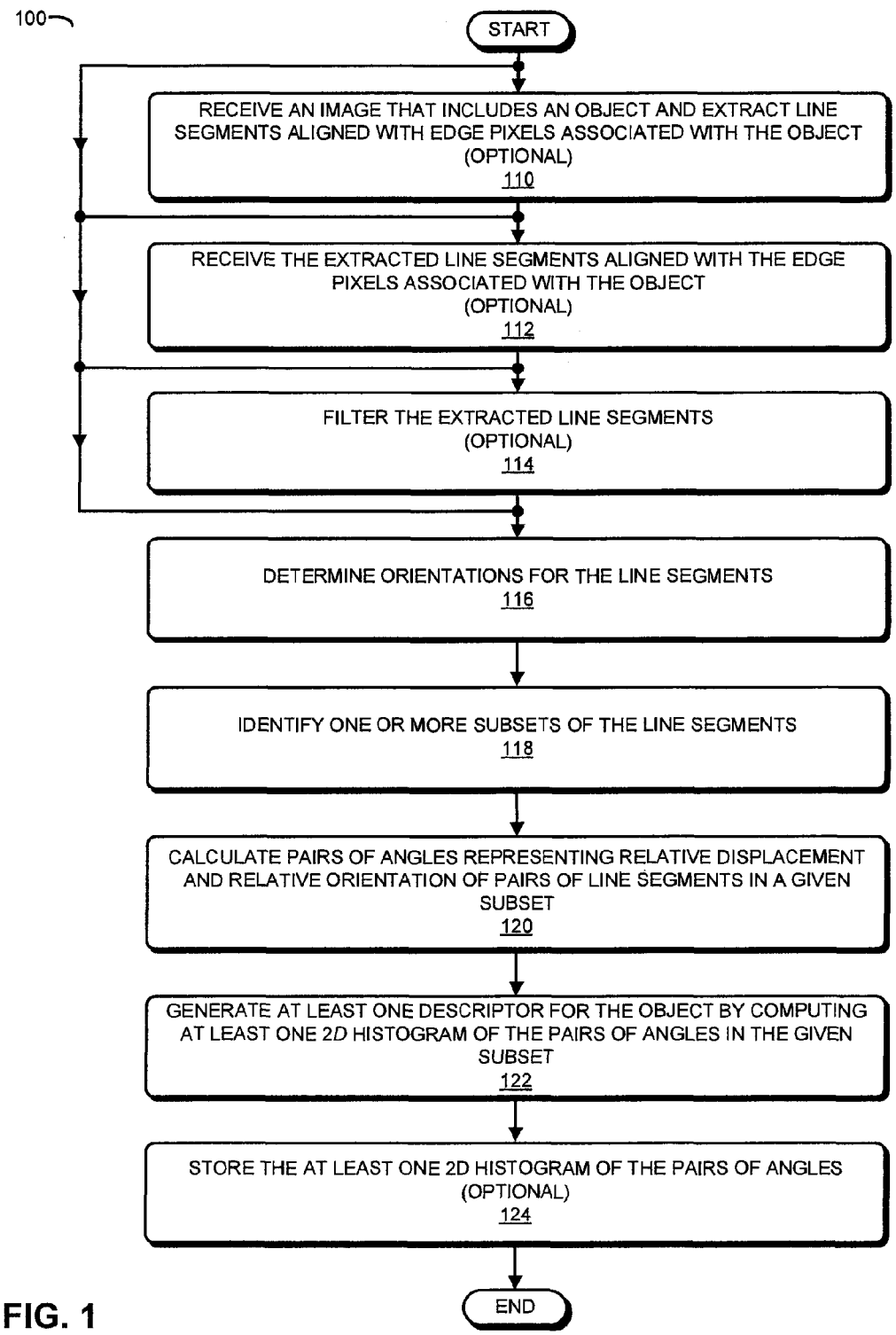
FIG. 1 is a flow chart illustrating a method for generating at least one descriptor for an object in accordance with an embodiment of the present disclosure.
Figure 11:
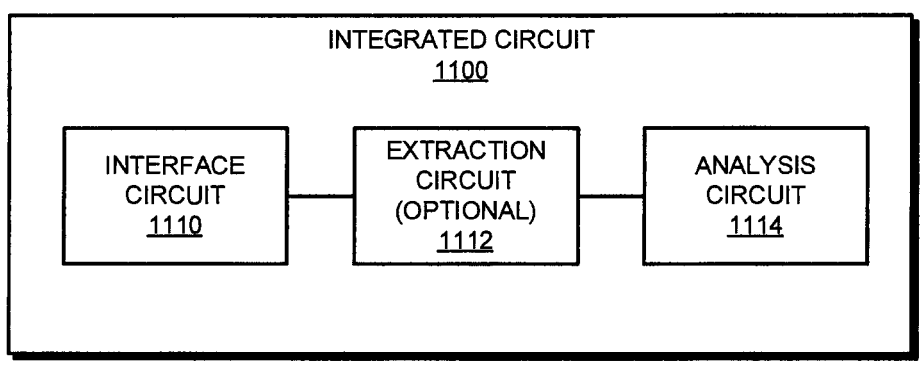
FIG. 11 is an integrated circuit that performs one or more operations in the methods of FIGS. 1 and 2 in accordance with an embodiment of the present disclosure.

FIG. 1 presents a flow chart illustrating a method 100 for generating at least one descriptor for at least a given subset of line segments aligned with the edge pixels associated with an object in an image (which is sometimes referred to as an 'edge-pixel-feature descriptor,' or a 'bunch of lines descriptor' or BOLD), which may be performed by a computer system (such as computer system 900 in FIG. 9) and/or an integrated circuit (such as integrated circuit 1100 in FIG. 11). During operation, the computer system may optionally receive an image that includes the object (operation 110) and, as described further below with reference to FIG. 3, may optionally extract line segments aligned with edge pixels associated with the object (operation 110). Alternatively, the computer system may optionally receive the extracted line segments aligned with the edge pixels associated with the object (operation 112) instead of optionally receiving the image (operation 110) and optionally extracting the line segments (operation 110). Note that receiving the image or the extracted line segments may involve accessing the image or the extracted line segments in a computer-readable memory. Alternatively, the image or the extracted line segments may be received from another electronic device via and/or a network (such as the Internet). Moreover, note that at least some of the extracted line segments may not be coupled or connected to (i.e., may be de-coupled from) a remainder of the extracted line segments.

In the present discussion, an 'edge pixel' should be understood to mean a point at which a sharp variation along a certain direction of a quantity defined over the image domain occurs. For example, the quantity may include brightness in the case of a gray-scale image, as well as color in the case of a color image or depth in the case of a range image (in which the pixel values correspond to or are related to distance). Therefore, edge pixel should be understood to include external-contour edges of the object, as well as any sharp intensity variation, even within the object (i.e., 'edge pixel' is not limited to external edges). Moreover, 'associated' should be understood to mean 'related to.' However, the relationship may be indirect. Thus, 'associated' may imply a relationship that is less strong than 'a function of' or 'corresponding to.' Nonetheless, in some embodiments 'associated' may encompass these more direct relationships. Furthermore, an 'image' should be understood to mean a set of values that include information that represents one or more objects. For example, the set of values may include a 2-dimensional (2D) array of pixels that each have associated values, such as gray-scale values and/or color values. However, an 'image' may include a set of images (such as 2D slices) or may include 3D information, such as a hologram. (Therefore, an image may include magnitude and/or phase information.) In general, an image may be obtained using a camera or an imaging sensor (such as a CMOS or a CCD imaging sensor). Alternatively or additionally, an image may be provided or generated by an electronic device, such as a computer. In some embodiments, an image may include a drawing. Additionally, an 'object' should be understood to mean a thing or an article, which may be included in a portion of an image.

Then, the computer system may determine orientations for the line segments (operation 116). As described further below with reference to FIG. 4, these orientations may be determined based on contrast polarity of the line segments. For example, an orientation of the given line segment may include a direction aligned with the given line segment, and a sign computed by taking a cross product of a gradient at a location on the given line segment and the direction.

Moreover, the computer system may identify one or more subsets of the line segments (operation 118), where a given subset includes k of the line segments that are proximate to a given line segment in the line segments. For example, the k line segments in the given subset may be nearest neighbors to the given line segment, such as the nearest 5, 10, 15 or 20 line segments.

Next, the computer system may calculate pairs of angles representing relative displacement and relative orientation of pairs of line segments in the given subset (operation 120). As described further below with reference to FIG. 5, a given pair of angles for a given pair of line segments in the given subset may include: a first angle at the location on a first line segment in the given pair of line segments between the first line segment and a second line segment in the given pair of line segments, and a second angle at the location on the second line segment between the second line segment and the first line segment. Note that the location on the first line segment and the location on the second line segment may include: midpoints of the first line segment and the second line segment; end points of the first line segment and the second line segment; and/or points on the first line segment and the second line segment separated by a minimum distance between the first line segment and the second line segment. Furthermore, note that calculating the given pair of angles may involve an operation other than calculating a dot product between the first line segment and the second line segment. For example, calculating the first angle may involve rotating the first line segment clockwise over a connecting line segment that couples the first line segment and the second line segment, and calculating the second angle may involve rotating the second line segment clockwise over the connecting line segment.

Furthermore, the computer system may generate the (local, as opposed to global) descriptor for the given subset by computing at least one 2D histogram of the pairs of angles (operation 122) between pairs of line segments in the given subset based on cells or bins defined by angular quantization values. Additionally, as described further below with reference to FIG. 6, for the given pair of angles the at least one 2D histogram may include weights in neighboring, adjacent cells to a cell that includes the given pair of angles. The weights may be determined using bilinear interpolation, and a sum of the weights may equal a constant (such as one). Note that additional descriptors may be optionally generated by computing additional 2D histograms of the pairs of angles in other subsets, where a given 2D histogram corresponds to, is related to or is a function of the pairs of angles in a particular subset.

In some embodiments, prior to determining the orientations (operation 116), the computer system optionally filters the line segments (operation 114) based on lengths of the line segments and a threshold value. For example, the threshold value may be 4-5 pixels. Moreover, in some embodiments the computer system optionally stores the at least one 2D histogram of the pairs of angles (operation 124) in a computer-readable memory that includes a set of descriptors of objects, where, for a given object, the set of descriptors includes at least one descriptor.

Note that the computer system may optionally generate a set of descriptors for the object by repeating at least some of the aforementioned operations for multiple images of the object from different vantage points. Alternatively or additionally, the computer system may optionally generate a set of descriptors for multiple subsets of the line segments in the object. Furthermore, the computer system may generate the set of descriptors for the object by repeating at least some of the aforementioned operations for different values of k.

Moreover, note that the computer system may optionally associate at least a portion of the image with an object category based on an object classifier. This object classifier may not classify a single local descriptor, but instead may classify a set of local descriptors collected into a proper representation (such as a so-called 'bag' of features that can be used in the visual recognition of object categories).

More generally, after optionally receiving the image that includes the object (operation 110) or optionally receiving the extracted line segments (operation 112), the computer system may generate the at least one descriptor for the given subset by computing the at least one 2D histogram of the pairs of angles between the pairs of line segments in the given subset that are aligned with the edge pixels associated with the object. The at least one 2D histogram may represent the relative displacement and the relative orientations of the pairs of line segments in the given subset, and the at least one 2D histogram may exclude lengths of the line segments.

Figure 2:
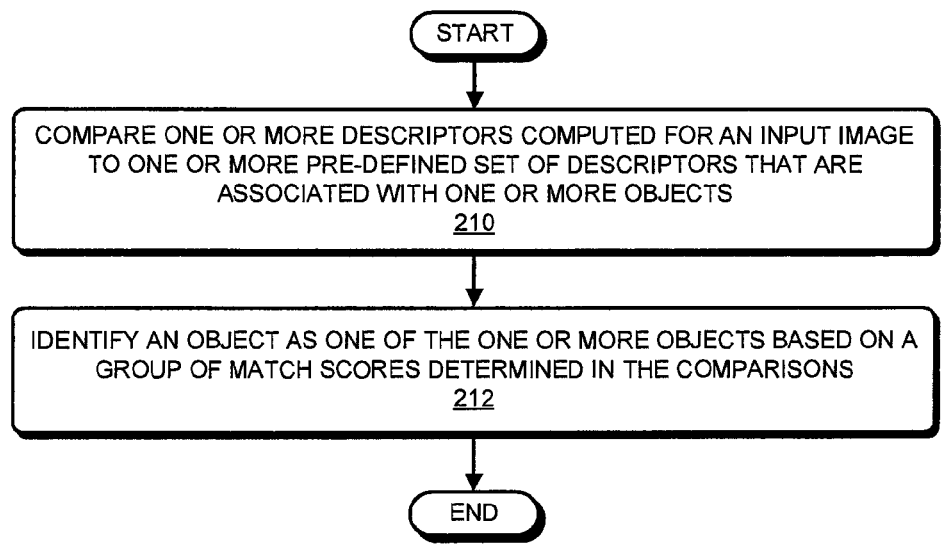
FIG. 2 is a flow chart illustrating the method for detecting the object in accordance with an embodiment of the present disclosure.

In addition to generating the at least one local descriptor for the object, the description technique (which is sometimes referred to as a 'BOLD description technique') may be used to identify the object. This is shown in FIG. 2, which presents a flow chart illustrating the method for detecting the object, which may be performed by the computer system (such as computer system 900 in FIG. 9) and/or the integrated circuit (such as integrated circuit 1100 in FIG. 11). During operation, the computer system may compare one or more descriptors (e.g., the at least one 2D histogram) computed for the input image to one or more predefined sets of descriptors that are associated with one or more objects (operation 210).

Then, the computer system may identify the object as one of the one or more objects based on a group of match scores determined in the comparisons (operation 212). Note that the comparing may involve: determining match scores between the one or more descriptors computed for the input image and the predefined sets of descriptors based on Euclidean distances between the one or more descriptors and the predefined sets of descriptors (which establish pairwise correspondences or relationships between the descriptors); and selecting a subset of the matches based on the match scores (such as a subset of 'good' matches) using a Generalized Hough Transformation and/or robust homography estimation. Furthermore, note that the object may be identified as one of the one or more objects without using lengths of the line segments in the comparison. Identification of the object is described further below with reference to FIG. 7.

Object identification based on the aforementioned one or more edge-pixel-feature descriptors may be able to withstand significant clutter in the image and/or occlusion of the object, even when the object surface is characterized by poor informative content (e.g., texture-less objects). (In general, though, the description technique may be used with textured and/or texture-less objects.) Moreover, the one or more edge-pixel-feature descriptors may provide a compact and distinctive representation of groups of neighboring line segments aggregated over limited spatial supports, which is invariant to similarity transformations (such as rotation, translation and scale transformations), and which is robust to photometric distortions and noise. Furthermore, by leveraging the inherent strengths of descriptor-based approaches (e.g., robustness to occlusion and clutter, and scalability with respect to the size of the model library), the object-detection technique may also be computationally efficient (even when dealing with texture-less or scarcely textured objects), and may be scaled to large model libraries.

In some embodiments of method 100 (FIG. 1) and 200 (FIG. 2), there may be additional or fewer operations. For example, these methods may be used to generate descriptors (i.e., multiple 2D histograms) corresponding to, related to or a function of subsets of line segments aligned with the edge pixels associated with the object. Moreover, the order of the operations may be changed, and/or a group of operations may be combined into a single operation. For example, while line segments were used as an illustration of extracted features from the image in the preceding discussion, in other embodiments a wide variety of extracted features (or feature points) having associated orientations may be used. Therefore, in general, at least some of the operations in methods 100 (FIG. 1) and/or 200 may involve other 'geometric shapes' aligned with the edge pixels associated with the object instead of or in addition to the line segments. If the object has curvilinear edges, these geometric shapes may include: arcs, portions of an ellipse and/or angular segments. In general, the geometric shapes may be determined using an approximation to the edge pixels associated with the object in the image.

In an exemplary embodiment, multiple edge-pixel-feature descriptors are used in conjunction with a scale invariant feature transform (SIFT)-like object-detection pipeline to provide performance improvements with respect to state-of-the-art edge-based template matching approaches. For example, the edge-pixel-feature descriptors may include compact descriptions of groups of line segments. Line segments are repeatable tokens of information that can be efficiently extracted from images to describe object contours. However, because a single line segment is scarcely informative, groups of neighboring line segments are used to build up a representation of object parts, which is sometimes referred to as a 'bunch of lines descriptor' (BOLD). The cues deployed in BOLD may be encoded into a compact 2D histogram, and may include relative orientations and displacements between pairs of line segments in a subset of the line segments, as well as contrast polarity, because these cues provide a favorable trade-off between distinctiveness and robustness.

Figure 3:
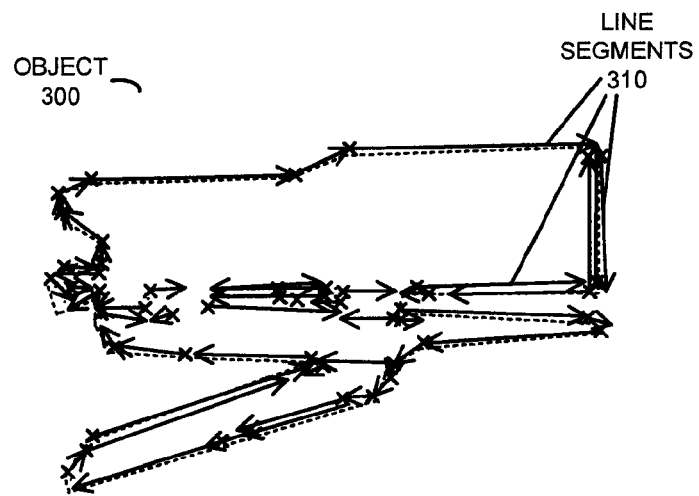
FIG. 3 is a drawing illustrating line segments extracted from polygonal approximation of edges of an object in the method of FIG. 1 in accordance with an embodiment of the present disclosure.

BOLD is a descriptor for line-segment features associated with edge pixels of objects. These line segments can be obtained using a variety of approaches, such as: by construction from any local feature characterized by a location and an orientation; by using a polygonal approximation to the output of an edge detector; and/or by applying a specific line-detector technique. The resulting extracted line segments are shown in FIG. 3, which presents line segments 310 detected from polygonal approximation of edges of an object 300 (which are illustrated using dotted lines). Note that line segments 310 may describe the contours of object 300. Moreover, line segments 310 may describe object 300 without using intensity information.

After line segments 310 are detected, an optional pruning or a filtering operation may be applied to improve the repeatability of extracted line segments 310 by retaining only a subset of the initially extracted line segments based on their geometric characteristics. For example, very small line segments (such as those smaller than 4-5 pixels) may be discarded, because these line segments may be due to noise.

Assuming a set of repeatable line segments S has been extracted from the image, a BOLD may be computed for each line segment $\vec{s}_i \beta S$ by aggregating together geometrical cues related to neighboring line segments. In particular, a BOLD may aggregate together geometric primitives computed over pairs of neighboring line segments. These geometric primitives may provide invariance to rotation, translation and scaling operations. In addition, the geometric primitives may be robust to noise and may be efficiently computed.

Figure 4:
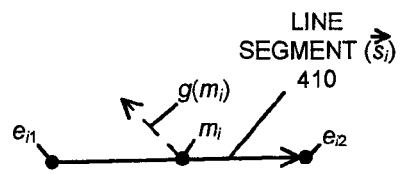
FIG. 4 is a drawing illustrating defining a line-segment orientation in the method of FIG. 1 in accordance with an embodiment of the present disclosure.

As shown in FIG. 4, which presents a drawing illustrating defining a line-segment orientation, each of the line segments $\vec{s}_i \epsilon S$ may be associated with a unique orientation. The direction of this orientation may be given by the direction of line segment $\vec{s}_i$ 410, while the sign is determined based on the gradient $\vec{g}(m_i)$ at the midpoint $(m_i)$ of $\vec{s}_i$. Initially, one of the two possible orientation signs may be chosen randomly (e.g., in FIG. 4, from endpoint $e_{i2}$ to endpoint $e_{i1}$). Then, if the sign of the cross product between $\vec{s}_i$ and $\vec{g}(m_i)$ is the same as that of a reference unit vector ($\hat{n}$) normal to the image plane (pointing towards the observer), the orientation sign may be kept. Otherwise, the other orientation may be taken. Specifically, a canonically oriented line segment $\vec{s}_i$ may be defined as $$\text{sign}(\vec{s}_i) = \frac{(\overrightarrow{e_{i2} - e_{i1}}) x \vec{g}(m_i)}{\|(\overrightarrow{e_{i2} - e_{i1}}) x \vec{g}(m_i)\|} \cdot \hat{n}$$

and $$\vec{s}_i = \text{sign}(s_i) \cdot (\overrightarrow{e_{i2} - e_{i1}}),$$

where 'x' denotes the cross product, and denotes the dot product. Therefore, the sign is ±1 depending on the cross product between $(\overrightarrow{e_{i2} - e_{i1}})$ and $\vec{g}(m_i)$ having or not having the same sign as $\hat{n}$, which then determines whether $e_{i1}$ and $e_{i2}$ should be actually swapped or not to determine $\vec{s}_i$. Note that, because line segments extracted from the image typically are close to intensity contours, the gradient magnitude at the midpoint may be sufficiently large to ensure a repeatable and robust contrast polarity, which may ensure that the canonical orientation assigned to the line segment is stable and robust.

Then, the k nearest line segments to $\vec{s}_i$ (which are sometimes referred to as a 'bunch') may be found, where k is a parameter of the BOLD description technique. (In general, note that larger values of k typically result in improved descriptiveness, but tend to include more clutter.) These k nearest line segments may be determined using a brute force approach, as well as by means of efficient indexing techniques, as is known in the art.

Figure 5:
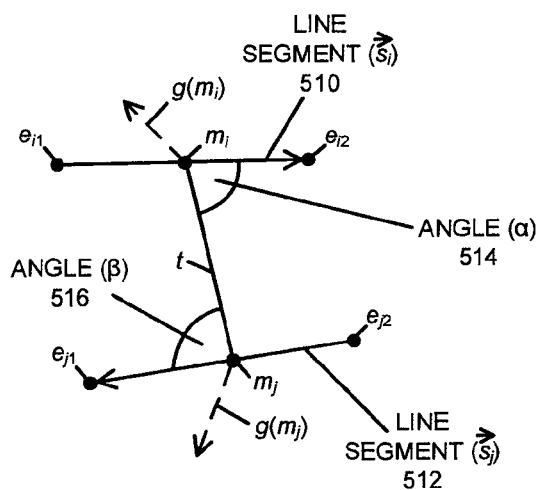
FIG. 5 is a drawing illustrating a pair of angles between line segments in a given subset in the method of FIG. 1.

After the k nearest line segments are determined, the description technique may iteratively proceed as follows for each pair formed by $\vec{s}_i$ and each of its k neighboring line segments. In particular, as shown in FIG. 5, which presents a drawing illustrating a pair of angles ($\alpha$) 514 and ($\beta$) 516 between line segments 510 and 512, angle $\alpha$ 514 and angle $\beta$ 516 may be computed between the central line segment (line segment 510 in FIG. 5) and each other line segment in the bunch (such as line segment 512 in FIG. 5). Note that angle $\alpha$ 514 may be the clockwise angle between the vector $\vec{s}_i$ given by the orientation of line segment 510 and the vector $\vec{t}_{ij}$ from the midpoint $m_i$ of line segment 510 and the midpoint $m_j$ of the neighbor line segment 512. Similarly, angle $\beta$ 516 may be the clockwise angle between the vector $\vec{s}_j$ given by the orientation of the neighbor line segment 512 and the vector $\vec{t}_{ji}$ from the midpoint $m_j$ of the neighbor line segment 512 and the midpoint $m_i$ of line segment 510. Note that the pair of angles $\alpha$ 514 and $\beta$ 516 may encode the geometric relationship between line segments 510 and 512, and may be rotation and scale invariant. Therefore, the pair of angles $\alpha$ 514 and $\beta$ 516 may represents a good trade-off between descriptiveness and robustness.

In an exemplary embodiment, based on the previous definitions, the proposed geometric primitive consists in angles $\alpha$ 514 and $\beta$ 516, which can be uniquely associated to a pair of oriented line segments 510 and 512 in a given subset or bunch of line segments. As noted previously, angle $\alpha$ 514 may measure the clockwise rotation which aligns $\vec{s}_i$ to $\vec{t}_{ij}$, and angle $\beta$ 516 may measure the clockwise rotation to align $\vec{s}_j$ to $\vec{t}_{ji}$. In order to obtain angles $\alpha$ 514 and $\beta$ 516, the smaller angles between two vectors may be computed as $$\alpha^* = \arccos\left(\frac{\vec{s}_i \cdot \vec{t}_{ij}}{\|\vec{s}_i\| \cdot \|\vec{t}_{ij}\|}\right) \text{ and } \beta^* = \arccos\left(\frac{\vec{s}_j \cdot \vec{t}_{ji}}{\|\vec{s}_j\| \cdot \|\vec{t}_{ji}\|}\right),$$

which yields measurements within the range [0;π]. Then, a further disambiguation operation may be applied to pick either the smaller or larger angle between the pair of vectors. In particular, $$\alpha = \alpha^* \text{ if } \left(\frac{\vec{s}_i \cdot \vec{t}_{ij}}{\|\vec{s}_i x \vec{t}_{ij}\|}\right) \cdot \hat{n} = 1,$$

otherwise $\alpha = 2\pi - \alpha^*$; and $$\beta = \beta^* \text{ if } \left(\frac{\vec{s}_j \cdot \vec{t}_{ji}}{\|\vec{s}_j x \vec{t}_{ji}\|}\right) \cdot \hat{n} = 1,$$

otherwise $\beta = 2\pi - \beta^*$ Therefore, the disambiguation operation may provide measurements within the entire [0; 2π] angular range.

The disambiguation operation may allow local configurations that otherwise would have been considered as equivalent to be distinguished from each other, and thus may allow the disambiguated angles to be used to detect unlikely transformations (such as simultaneous mirroring and contrast-polarity inversion). As usual, higher distinctiveness may come with a price in terms of robustness. Nonetheless, the chosen angles $\alpha$ 514 and $\beta$ 516 may be more effective than angles $\alpha^*$ and $\beta^*$, and the angle-based primitives may provide superior performance with respect to distances and lengths. In addition, note that angles $\alpha$ 514 and $\beta$ 516 may depend not only on the relative orientation between line segments 510 and 512, but may also be a function of their relative spatial displacement. Therefore, angles α 514 and β 516 may represent a compact geometric primitive that encodes relative orientation and position, as well as contrast polarity (because line segments 510 and 512 are oriented).

At the end of this operation, k angle pairs (α, β) have been computed. These pairs may then be accumulated into a 2D joint histogram, with the domain of both dimensions (e.g., the angular range from 0° to 360°) discretized according to a given quantization operation θ (which is another parameter of the BOLD description technique). This approach may provide robustness with respect to clutter and occlusion, so that a single missing line segment from a bunch does not disrupt description. Moreover, because of the quantization, the 2D histogram-based descriptor may inherently provide good robustness to inaccuracies in line-segment localization.

Figure 6:
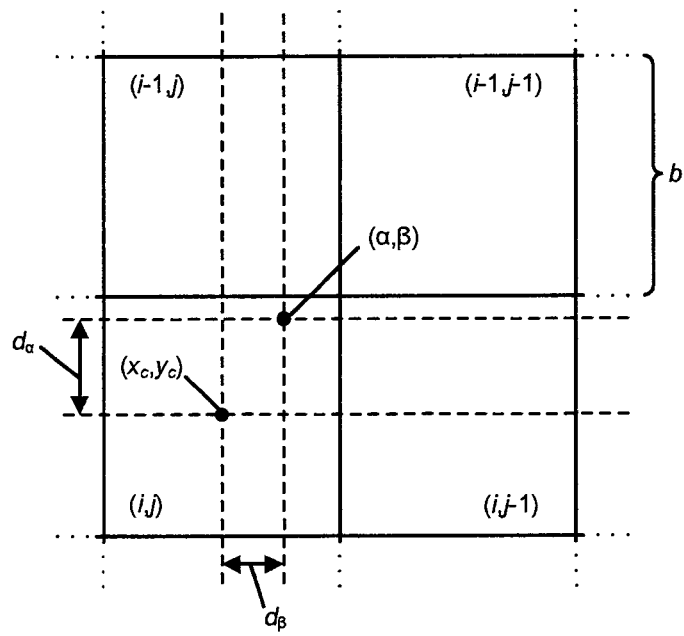
FIG. 6 is a drawing illustrating a 2-dimensional (2D) histogram of pairs of angles, which includes bilinear interpolation, in the method of FIG. 1 in accordance with an embodiment of the present disclosure.

In some embodiments, in order to counteract the quantization noise introduced by histogram accumulation (which may decrease the distinctiveness of BOLDs), angle pairs are added to the 2D histogram by means of bilinear interpolation. This is shown in FIG. 6, which presents a drawing illustrating a 2D histogram 600 of pairs of angles that includes bilinear interpolation. In particular, given the coordinates ($x_c$, $y_c$) of the central point of the quantization bin in which the pair (α, β) falls, the weight may be divided among nearby bins depending on the distance between these two points (i.e., between the measurement (α, β) and the center of the bin). In particular, two weights may be computed as $$w_x = 1 - \frac{|d_\beta|}{b}, 0.5 \le w_x \le 1 \text{ and } w_y = 1 - \frac{|d_\alpha|}{b}, 0.5 \le w_y \le 1$$

where $d_\beta$ is the offset to the central point of the quantization bin along the x angular axis, b is the size of the quantization bin, and $d_\alpha$ is the offset to the central point of the quantization bin along the y angular axis. Then, the weights may be accumulated into the four nearby histogram bins or cells as:

hist(i,j)+=$w_x \cdot w_y$;

hist(i,j−1)+=$w_x \cdot (1-w_y)$;

hist(i+1,j)+=$(1-w_x) \cdot w_y$; and hist(i+1,j+1)+=$(1-w_x) \cdot (1-w_y)$.

In an exemplary embodiment, the number of bins for each histogram dimension may be $$\frac{2\pi}{\theta} = 12 \text{ for } \theta = 30°.$$

Note that all of the interpolated weights accounting for the same angle pair may sum to one. Moreover, once all angle pairs have been accumulated, 2D histogram 600 may be normalized so that the entries sum-up to one. Thus, BOLDs may be normalized by their $L_2$ norm, so as to obtain vectors laying onto the unit sphere. This may be beneficial, e.g., when using matching measures derived from the $L_2$ norm to obtain upper bounded values of the distance between descriptors.

Different neighborhoods may be used in 2D histograms (such as 2D histogram 600) to achieve multiple descriptions for the given line segment. In particular, 2D histograms may be generated for different subsets or bunches of line segments. This approach allows for seamlessly and conveniently encoding of both local parts and large-scale structures in the object. Note that 2D histogram 600 may exclude the line-segment lengths. Also note that a BOLD may be a longer descriptor conceived to achieve higher distinctiveness. As described previously, the BOLD description technique may allow for a general description technique because it is not restricted to line segments. Instead, a BOLD may describe any kind of feature point, e.g., a difference of Gaussian (DOG) detector or fast Hessian keypoints, provided that the feature points are endowed with a characteristic or local-canonical orientation. Therefore, a BOLD may provide an efficient way to encode the local information around a certain small area in an image in a better way that captures what is important and filter out the rest so object parts can be recognized under different viewpoints (such as: closer, farther, translated, rotated, etc.).

When building up a BOLD, the number of neighboring line segments k may impact the resulting model. For example, using a large number of line segments may increase the distinctiveness of BOLDs, because there are lower ambiguities due to similar bunches arising from non-corresponding object parts. On the other hand, a high value of k tends to include, within the same bunch, neighboring line segments that may belong to clutter, which can lead to somewhat corrupted 2D histograms. Accumulating the geometric primitives over 2D histograms may help increase the robustness up to a certain extent, e.g., so long as the number of clutter elements is less than the number of object elements. Moreover, a good choice for k may also depend on the type of objects to be detected. For example, small values of k may be used for objects that include simple shapes made out of a few line segments so as not to incorporate clutter, whereas larger values of k may be used for more complicated objects structures.

Instead of trying to tune k for each specific scenario, in some embodiments multiple k values are simultaneously deployed to describe each line segment $\vec{s}_i$. This approach may provide seamless and convenient encoding of simple shapes, local parts, and large-scale structures. Indeed, this approach may not only eliminate the need to select k, but may also significantly improve the performance relative to those obtained using a single-sized bunch. In an exemplary embodiment, the single-sized bunch had k equal to 10, and the multiple bunches used k values of 5, 10, 15 and 20 (where a separate 2D histogram was generated for each subset and for each of the k values). The latter approach may provide improved performance without significantly slowing down the overall description technique.

A BOLD may be used seamlessly within a descriptor-based object recognition pipeline to identify or recognize objects. Given a model image and an input image possibly containing the model, features may be detected and described from both images. Then, BOLDs associated with the model image and the input image may be matched based upon a distance measure (such as the Euclidean distance) or, because a BOLD is a histogram, specific function may be used to assess the similarity/dissimilarity between histograms, such as histogram intersection. Moreover, different types of BOLD features (e.g., as a result of different choices of the parameter k) may also be deployed synergistically to improve recognition performance. Furthermore, separate BOLD-matching pipelines for connected and disconnected line segments may also be run in parallel. In a similar manner, BOLD features may be deployed together with complementary features, such as the blob-like features that are often used to recognize textured objects. Therefore, in some embodiments, the BOLD description technique is used in conjunction with another description technique, such as: SIFT, speed-up robust features (SURF), a binary descriptor (such as ORB), binary robust invariant scalable keypoints (BRISK), fast retinal keypoint (FREAK), etc.

Figure 7:
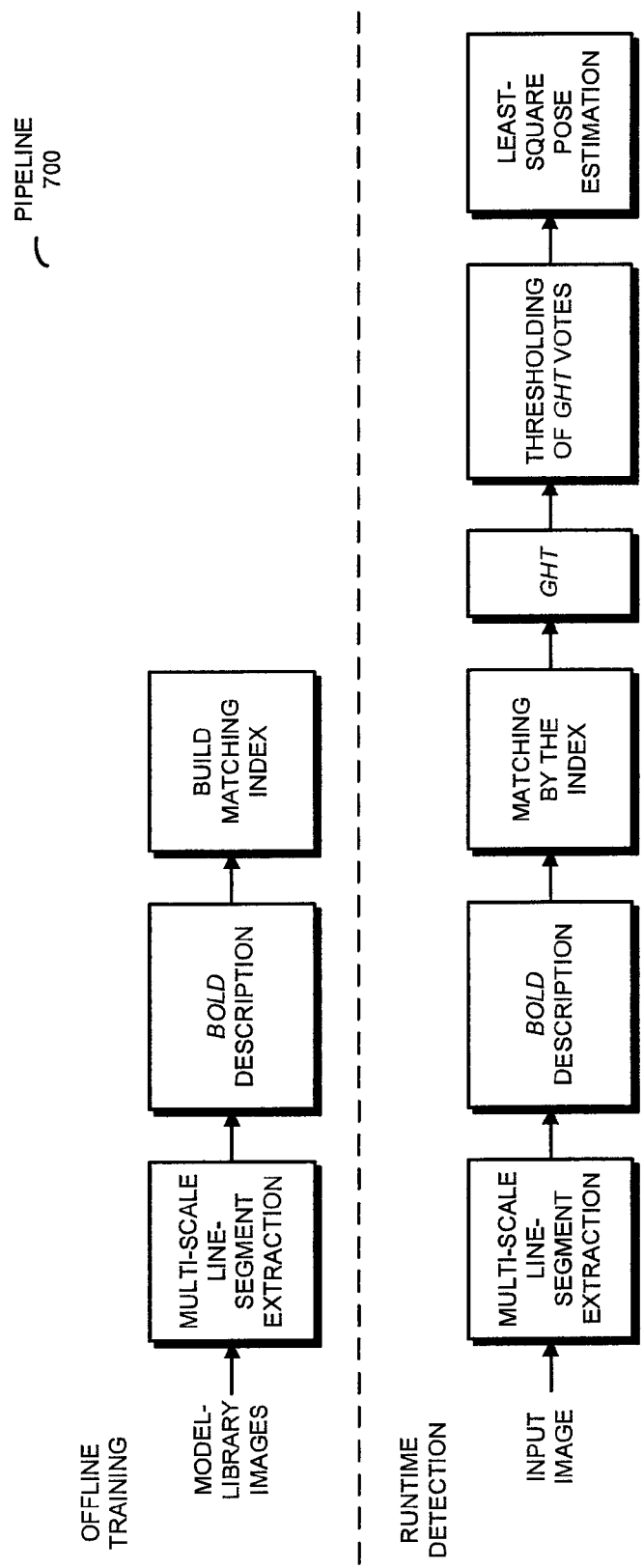
FIG. 7 is a block diagram illustrating a pipeline for detecting an object in accordance with an embodiment of the present disclosure.

As shown in FIG. 7, which presents a block diagram illustrating a pipeline 700 for detecting an object, in an exemplary embodiment one or more BOLDs may be deployed within a SIFT-like pipeline, where the detection and description operations or stages are conveniently modified to deal with texture-less objects. However, as noted previously, the BOLD description technique may be used for objects with texture, with poor texture and/or without texture. Pipeline 700 can be divided into two stages: an offline training stage and a runtime detection stage. In the training stage, given a set of model images, line segments may be extracted, described using BOLDs and stored into an indexing structure (which may include at least one descriptor for each object in the images). Because object contours can change notably at different scales, and sometimes edges can completely disappear if either the object is blurred or if a significant scale variation occurs, the initial operation in pipeline 700 may include multi-scale extraction of line segments. In particular, a pyramid or a hierarchy of images may be built by resealing the input image at different resolutions. Then, a line-segment extraction operation may be carried out at each level of the pyramid. The scale of each line segment may be retained so that, in the next operation, a BOLD for each of the extracted line segments may be computed taking into account only the neighbors found at the same scale. This approach may counteract the problem of missing line segments due to large scale variations. Next a matching index may be built. In particular, BOLDs extracted from all images belonging to the model library may be stored in a fast-indexing data structure, such as a randomized Kd-tree forest. This may facilitate efficient searching even with a large model library, because lookups may be logarithmic as opposed to linear in time. In an exemplary embodiment, the BOLD description technique provides a nearly constant detection time for a model library with up to 100 models.

In the runtime detection stage, given an input image possibly containing one or more objects that may be described by models (i.e., BOLDs) in the model library, line segments may be extracted and described using the same two initial operations as in the training stage. Then, given the determined BOLD descriptors for the extracted line segments, matching may be performed using the fast-indexing data structure. For example, for each BOLD extracted in the input image, the fast-indexing data structure may be queried based on the Euclidean ($L_2$) distance for m-dimensional vectors, and a set of correspondences or potential matches between local features in the input image and the BOLDs in the model library may be calculated. While the Euclidean distance was used as an illustration in the preceding discussion, a variety of other matching metrics, match scores or measures may be used to achieve good results without sacrificing efficiency, such as those specifically conceived for histogram data (e.g., histogram intersection).

Next, for each model that has one or more correspondences with the BOLDs computed for the input image, a Generalized Hough Transform (GHT) may be used to validate and filter out wrong correspondences (i.e., outliers) by identifying a subset of geometrically coherent or consistent correspondences. For example, an object in the model library may be deemed detected (i.e., present in the input image) if the number of consistent correspondences between BOLDs identified by the GHT is above a threshold. In an exemplary embodiment, an object in the model library is detected if 4-5 BOLD correspondences are identified as consistent by the GHT. (Note that, because of their high distinctiveness, the BOLD description technique is very robust to occlusions. Therefore, just a few matching features can provide enough evidence to reliably determine the presence of an object even in heavily cluttered input images.)

If a model is deemed detected, its pose may be computed by a least-square estimation of a particular transformation (e.g., a similarity or homography transformation), which maps the model image into the input image. This may allow the precise location of the model object in the input image to be determined.

Figure 8:
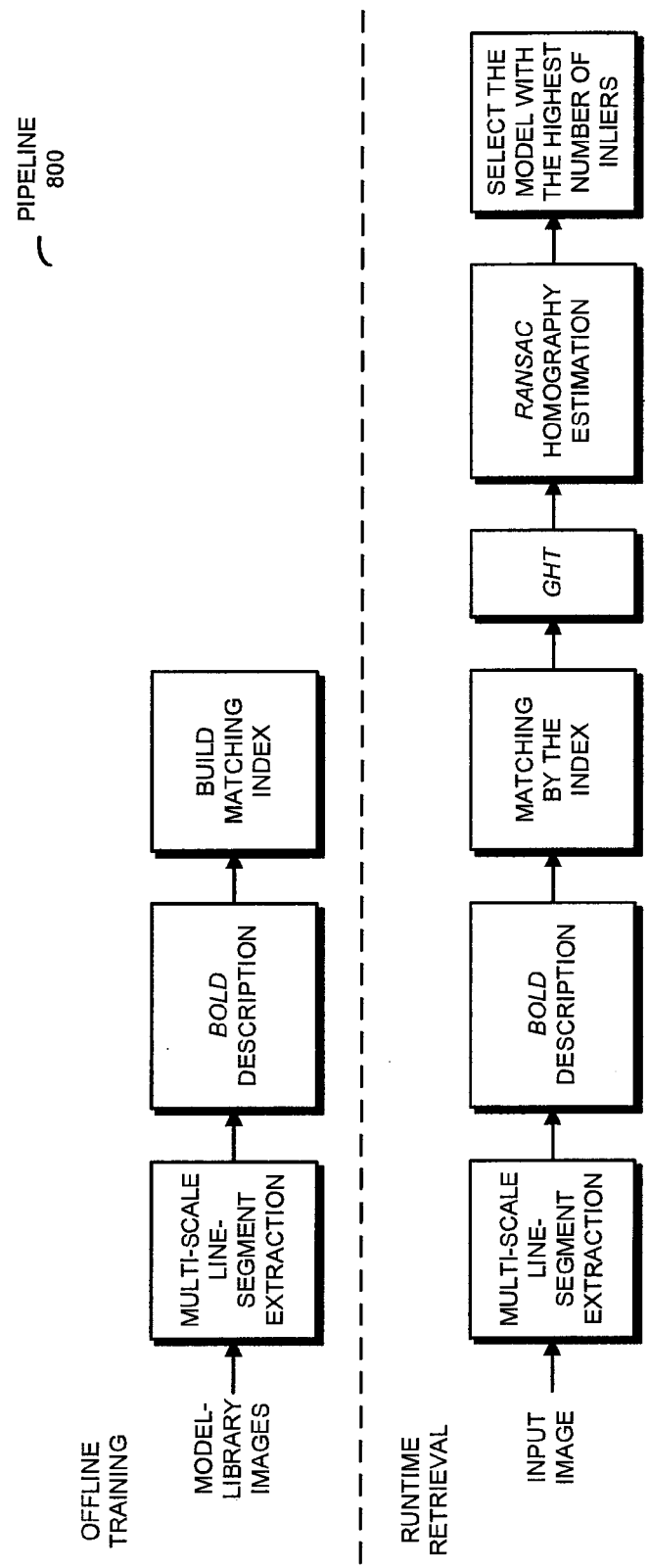
FIG. 8 is a block diagram illustrating a pipeline for retrieving an object in accordance with an embodiment of the present disclosure.

The BOLD description technique may also be used for object retrieval. This is shown in FIG. 8, which presents a block diagram illustrating a pipeline 800 for retrieving an object. Pipeline 800 can be divided into two stages: an offline training stage and a runtime retrieval stage. In the training stage, the same operations may be performed as in the training stage in pipeline 700 (FIG. 7). In the runtime retrieval stage, given an input image possibly containing one or more objects that may be described by models in a model library, line segments may be extracted and described using the same two initial operations as in the training stage. Then, given the determined BOLD descriptors for the extracted line segments, matching may be performed using the fast-indexing data structure. For example, for each BOLD extracted in the image, the fast-indexing data structure may be queried based on the Euclidean ($L_2$) distance for m-dimensional vectors, and a set of correspondences or potential matches between local features in the image and the BOLDs in the model library may be calculated. While the Euclidean distance was used as an illustration in the preceding discussion, a variety of other matching metrics, match scores or measures may be used to achieve good results without sacrificing efficiency, such as those specifically conceived for histogram data (e.g., histogram intersection).

Next, for each model that has one or more correspondences with the BOLDs for the image, a GHT may be used to validate and filter out outlier models by identifying a subset of geometrically coherent or consistent correspondences. Furthermore, the GHT matches may be further validated using a random-sample-consensus (RANSAC)-based homography estimation. The model with the highest number of RANSAC inliers (i.e., the highest number of valid matches) may be deemed the retrieved model.

In some embodiments, the BOLD description technique is used to recognize object categories rather than specific object instances. For example, BOLDs may be used together with consolidated techniques such as bags-of-visual words or implicit shape models in order to generalize to object categories. For example, 'bags' of vector-quantized BOLDs can be learned using an object classifier, which then associates each query image or image patch to an object category.

While the BOLD description technique may not yield the highest classification rate in the presence of highly textured models, it may be the best descriptor when the task is to retrieve images of texture-less objects. In addition, it may provide reasonably good accuracy with textured objects. Therefore, BOLD features may allow a descriptor-based pipeline to be leveraged to effectively detect texture-less objects, thereby achieving robustness to clutter and occlusion, and scalability with respect to the size of the model library. However, the use of extracted line segments may be a problem when attempting to detect mostly curvilinear shapes (e.g., round objects) because of the fragility of the linear approximation to highly curved contours. Furthermore, very simple shapes, such as those made out of just a few lines, may also be hardly detectable because of the limited informative content in their associated BOLDs. Thus, in some embodiments the set of shapes effectively dealt with using the BOLD description technique may be increased by using repeatable circular or elliptical arcs in conjunction with or in place of line segments. Additionally, the BOLD description technique may be used to perform 3D object detection based on a multi-view approach and/or under very different lighting or illumination conditions. Accordingly, features from multiple objects and vantage points may be stored in a fast-indexing data structure to efficiently look-up those from the incoming camera view and/or the current lighting conditions.

The BOLD description technique may be used in a wide variety of applications, including: self-checkout by a customer at a retail establishment, barcode reading, machine vision, industrial inspection (such as fruit grading, adaptive inspection systems and/or inspecting machined parts), manufacturing, robotics, security, surveillance (such as intruder monitoring, number-plate identification and/or people monitoring), authentication (such as face recognition), autonomous vehicles (such as detecting obstructions, exploring new surroundings and/or audio/visual surveillance), remote sensing (such as land management, crop classification and/or surveying by satellite), transportation (such as traffic monitoring, aerial navigation and/or transport safety), medical imaging (such as head imaging), video coding, etc.

Figure 9:
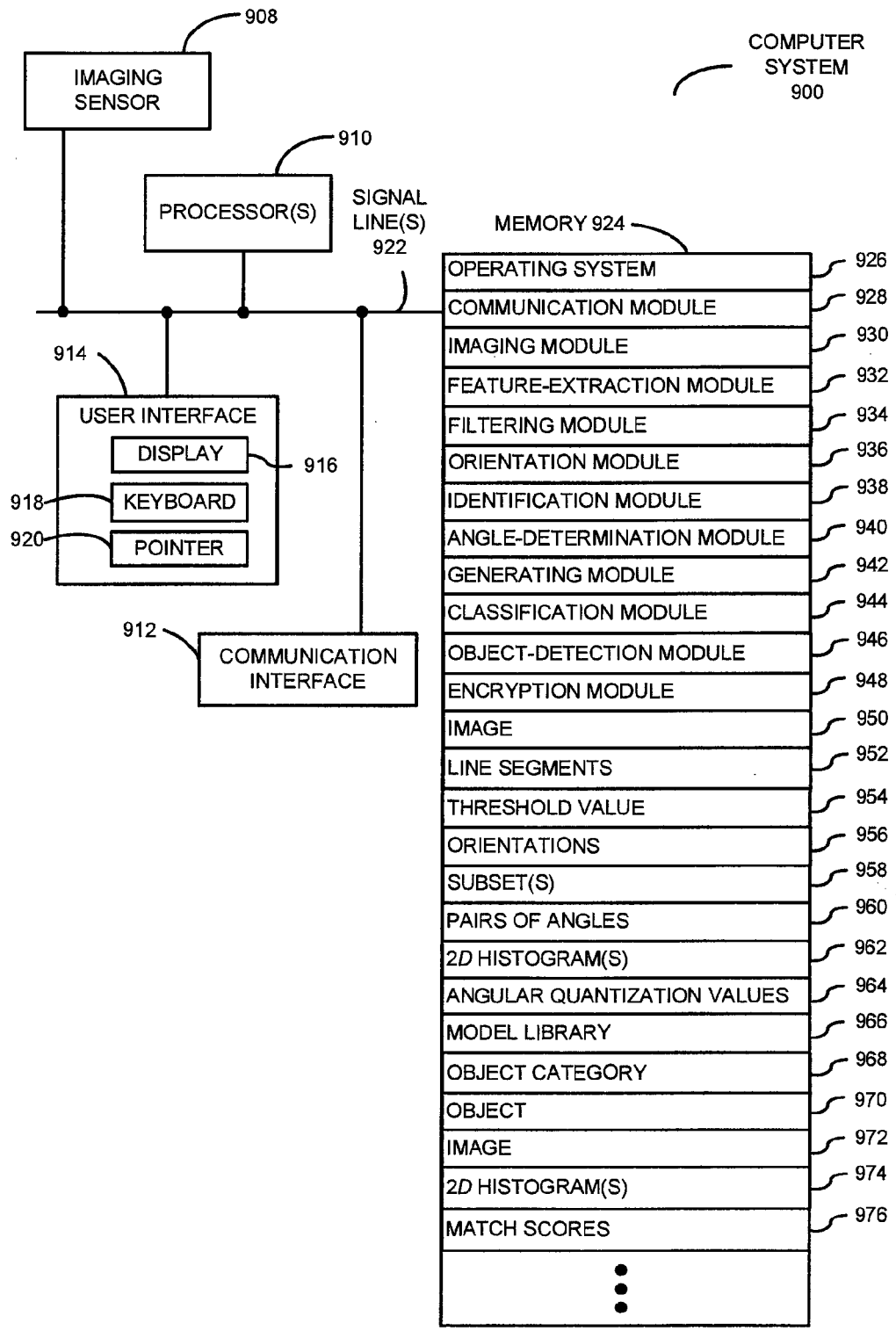
FIG. 9 is a block diagram illustrating a computer system that performs the methods of FIGS. 1 and 2 in accordance with an embodiment of the present disclosure.

We now describe embodiments of the computer system and the integrated circuit, and their use. FIG. 9 presents a block diagram illustrating a computer system 900 that performs methods 100 (FIG. 1) and/or 200 (FIG. 2). Computer system 900 includes one or more processing units or processors 910, a communication interface 912, a user interface 914, and one or more signal lines 922 coupling these components together. Note that the one or more processors 910 may support parallel processing and/or multi-threaded operation, the communication interface 912 may have a persistent communication connection, and the one or more signal lines 922 may constitute a communication bus. Moreover, the user interface 914 may include: a display 916, a keyboard 918, and/or a pointer 920, such as a mouse.

Memory 924 in computer system 900 may include volatile memory and/or non-volatile memory. More specifically, memory 924 may include: ROM, RAM, EPROM, EEPROM, flash memory, one or more smart cards, one or more magnetic disc storage devices, and/or one or more optical storage devices. Memory 924 may store an operating system 926 that includes procedures (or a set of instructions) for handling various basic system services for performing hardware-dependent tasks. Memory 924 may also store procedures (or a set of instructions) in a communication module 928. These communication procedures may be used for communicating with one or more computers and/or servers, including computers and/or servers that are remotely located with respect to electronic device 900.

Memory 924 may also include multiple program modules (or sets of instructions), including: imaging module 930 (or a set of instructions), feature-extraction module 932 (or a set of instructions), filtering module 934 (or a set of instructions), orientation module 936 (or a set of instructions), identification module 938 (or a set of instructions), angle-determination module 940 (or a set of instructions), generating module 942 (or a set of instructions), classification module 944 (or a set of instructions), object-detection module 946 (or a set of instructions), and/or encryption module 948 (or a set of instructions). Note that one or more of these program modules (or sets of instructions) may constitute a computer-program mechanism.

During the description technique, imaging module 930 may optionally acquire an image 950 using imaging sensor 908. Alternatively, computer system 900 may optionally receive image 950 via communication interface 912 and communication module 928.

Then, feature-extraction module 932 may optionally extract line segments 952 (and, more generally, geometric shapes) aligned with edge pixels associated with an object in image 950. Alternatively, computer system 900 may optionally receive extracted line segments 952 via communication interface 912 and communication module 928. In some embodiments, filtering module 934 optionally filters line segments 952 based on lengths of line segments 952 and a threshold value 954.

Next, orientation module 936 may determine orientations 956 for line segments 952. Moreover, identification module 938 may identify one or more subsets 958 of line segments 952, where a given subset includes k of line segments 952 that are proximate to a given line segment in line segments 952.

Furthermore, angle-determination module 940 may calculate pairs of angles 960 representing relative displacement and relative orientation of pairs of line segments 952 in each of the one or more subsets 958. Additionally, generating module 942 may generate one or more 2D histograms 962 of pairs of angles 960 (which correspond to, are related to or are a function of the one or more subsets 958) based on cells defined by angular quantization values 964. A given one of these 2D histograms may represent the relative displacement and the relative orientations of the pairs of line segments 952 in a given one of subsets 958, and 2D histograms 962 may exclude lengths of line segments 952.

Figure 10:
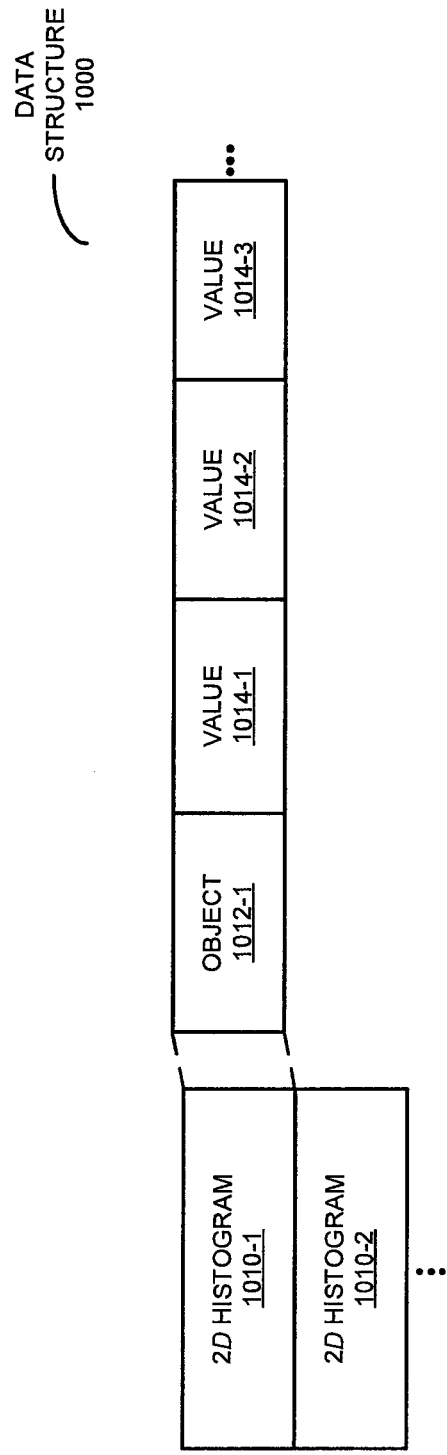
FIG. 10 is a data structure for use in conjunction with the computer system of FIG. 6 in accordance with an embodiment of the present disclosure.

Computer system 900 may store 2D histograms for multiple objects in a data structure (such as a model library 966). This is shown in FIG. 10, which presents a data structure 1000 for use in conjunction with computer system 900 (FIG. 9). In particular, data structure 1000 may include 2D histograms 1010. For example, 2D histogram 1010-1 may include: an object 1012-1, and (real) values 1014 for bilinear interpreted counts for pairs of angles and/or weights in cells. Note that there may be multiple 2D histograms 1010 for a given object.

Referring back to FIG. 9, in some embodiments classification module 944 optionally associates at least a portion of image 950 with an object category 968 based on an object classifier.

Furthermore, object-detection module 946 may identify an object 970 in image 972 using the 2D histograms in model library 966. For example, feature-extraction module 932, optional filtering module 934, orientation module 936, identification module 938, angle-determination module 940, and generating module 942 may generate one or more 2D histograms 974 of pairs of angles associated with object 970. Then, object-detection module 946 may identify object 970 based on match scores 976 between the one or more 2D histograms 974 and the one or more 2D histograms in model library 966.

Because information used in the BOLD description technique may be sensitive in nature, in some embodiments at least some of the data stored in memory 924 and/or at least some of the data communicated using communication module 928 is encrypted or decrypted using encryption module 948.

Instructions in the various modules in memory 924 may be implemented in: a high-level procedural language, an object-oriented programming language, and/or in an assembly or machine language. Note that the programming language may be compiled or interpreted, e.g., configurable or configured, to be executed by the one or more processors 910.

In some embodiments, at least some of the operations in the BOLD description technique are implemented using one or more integrated circuits. This is shown in FIG. 11, which presents an integrated circuit 1100 that performs one or more operations in methods 100 (FIG. 1) and/or 200 (FIG. 2). This integrated circuit may be used in conjunction with or independently of computer system 900 (FIG. 9).

In particular, integrated circuit 1100 may include an interface circuit 1110 that optionally receives the image that includes the object, and an optional extraction circuit 1112 that extracts the line segments aligned with the edge pixels associated with the object. Alternatively, interface circuit 1110 may optionally receive the line segments. Moreover, integrated circuit 1100 may include an analysis circuit 1114 that: determines the orientations for the line segments; identifies the one or more subsets of the line segments, where the given subset includes k of the line segments that are proximate to the given line segment in the line segments; calculates the pairs of angles representing the relative displacement and the relative orientation of the pairs of line segments in the subsets; and generates one or more descriptors for the object by computing one or more 2D histograms of the pairs of angles in corresponding or related subsets of the line segments based on the cells defined by the angular quantization values.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed previously and the corresponding descriptions and encode the data structures on a computer-readable medium. Those of skill in the art of integrated circuit fabrication can use such encoded data to fabricate integrated circuits comprising one or more of the circuits described herein.

Referring back to FIG. 9, although computer system 900 and integrated circuit 1100 (FIG. 11) are illustrated as having a number of discrete items, FIGS. 9 and 11 are intended to be a functional description of the various features that may be present in computer system 900 and integrated circuit 1100 (FIG. 11) rather than a structural schematic of the embodiments described herein. In some embodiments, some or all of the functionality of computer system 1100 and/or integrated circuit 1100 (FIG. 11) may be implemented in one or more application-specific integrated circuits (ASICs), field-programmable gate array (FPGAs), and/or one or more digital signal processors (DSPs). Furthermore, integrated circuit 1100 (FIG. 11) may be implemented using bipolar, PMOS and/or NMOS gates or transistors, and signals in these embodiments may include digital signals that have approximately discrete values and/or analog signals that have continuous values.

In general, computer system 900 may include one or more electronic devices, which may be implemented at one or more disparate locations. Therefore, in some embodiments, the BOLD description technique is resident on and executes on a single electronic device. This software application may be a standalone application or a portion of another application. Alternatively, at least a portion of the BOLD description technique is implemented using a software application that is resident on and which executes on multiple electronic devices. For example, a server may provide a web page via a network to a portable electronic device. This web page may be rendered by a web browser on the portable electronic device. Moreover, at least a portion of the software application may be an application tool that is embedded in the web page, and which executes in a virtual environment of the web browser. Thus, the application tool may be provided to the portable electronic device via a client-server architecture. In an exemplary embodiment, the application tool on the portable electronic device is used to acquire one or more images (such as image 950), and the one or more images may be communicated via the network to a remote server for subsequent processing.

Therefore, computer system 900 may include one of a variety of devices capable of manipulating computer-readable data or communicating such data between a group of computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, communication via communication interface 912 may occur using a network, such as: the Internet, World Wide Web (WWW), an intranet, a cellular-telephone network, LAN, WAN, MAN, or a combination of networks, or other technology enabling communication between computing systems.

Computer system 900 and/or integrated circuit 1100 (FIG. 11) may include fewer components or additional components. Moreover, a group of components may be combined into a single component, and/or a position of one or more components may be changed. In some embodiments, the functionality of computer system 900 and/or integrated circuit 1100 (FIG. 11) may be implemented more in hardware and less in software, or less in hardware and more in software, as is known in the art.

A computer-program product for use in conjunction with a computer system (900), the computer-program product comprising a non-transitory computer-readable storage medium and a computer-program mechanism embedded therein, to generate at least one descriptor for an object, the computer-program mechanism including: instructions for receiving extracted line segments aligned with edge pixels associated with the object in an image (operation 112); instructions for determining orientations for the line segments (operation 116); instructions for identifying a subset of the line segments (operation 118), wherein the subset includes k of the line segments that are proximate to a given line segment (410) in the line segments; instructions for calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and instructions for generating the at least one descriptor for the object (operation 122) by computing a 2-dimensional (2D) histogram (600) of the pairs of angles based on cells defined by angular quantization values.

The computer-program product of claim 22, wherein the orientations are determined based on contrast polarity of the line segments.

The computer-program product of claim 22, wherein the computer-program mechanism further comprises: instructions for comparing the set of descriptors to a predefined set of descriptors associated with a second object (operation 210); and instructions for identifying the object as the second object based on matches in the comparisons (operation 212).

A computer system (900), comprising: a processor (910); memory (924); and a program module, wherein the program module is stored in the memory (924) and configurable to be executed by the processor (910) to generate at least one descriptor for an object, the program module including: instructions for receiving extracted line segments aligned with edge pixels associated with the object in an image (operation 112); instructions for determining orientations for the line segments (operation 116); instructions for identifying a subset of the line segments (operation 118), wherein the subset includes k of the line segments that are proximate to a given line segment (410) in the line segments; instructions for calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and instructions for generating the at least one descriptor for the object (operation 122) by computing a 2-dimensional (2D) histogram (600) of the pairs of angles based on cells defined by angular quantization values.

A computer-system-implemented method for generating at least one descriptor for an object in an image, the method comprising: receiving an image that includes the object (operation 110); extracting line segments aligned with edge pixels associated with the object (operation 110); determining orientations for the line segments (operation 116); identifying a subset of the line segments (operation 118), wherein the subset includes k of the line segments that are proximate to a given line segment (410) in the line segments; using the computer system (900), calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and generating the at least one descriptor for the object (operation 122) by computing a 2-dimensional (2D) histogram (600) of the pairs of angles based on cells defined by angular quantization values.

A computer-program product for use in conjunction with a computer system (900), the computer-program product comprising a non-transitory computer-readable storage medium and a computer-program mechanism embedded therein, to generate at least one descriptor for an object in an image, the computer-program mechanism including: instructions for receiving an image that includes the object (operation 110); instructions for extracting line segments aligned with edge pixels associated with an object (operation 110); instructions for determining orientations for the line segments (operation 116); instructions for identifying a subset of the line segments (operation 118), wherein the subset includes k of the line segments that are proximate to a given line segment (410) in the line segments; instructions for calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and instructions for generating the at least one descriptor for the object (operation 122) by computing a 2-dimensional (2D) histogram (600) of the pairs of angles based on cells defined by angular quantization values.

A computer system (900), comprising: a processor (910); memory (924); and a program module, wherein the program module is stored in the memory (924) and configurable to be executed by the processor (910) to generate at least one descriptor for an object in an image, the program module including: instructions for receiving an image that include the object (operation 110); instructions for extracting line segments aligned with edge pixels associated with the object (operation 110); instructions for determining orientations for the line segments (operation 116); instructions for identifying a subset of the line segments (operation I 18), wherein the subset includes k of the line segments that are proximate to a given line segment (410) in the line segments; instructions for calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and instructions for generating the at least one descriptor for the object (operation 122) by computing a 2-dimensional (2D) histogram (600) of the pairs of angles based on cells defined by angular quantization values.

A computer-system-implemented method for generating at least one descriptor for an object, the method comprising: receiving extracted geometric shapes aligned with edge pixels associated with the object in an image (operation 112); determining orientations for the geometric shapes (operation 116); identifying a subset of the geometric shapes (operation 118), wherein the subset includes k of the geometric shapes that are proximate to a given geometric shape (410) in the geometric shapes; using the computer system (900), calculating pairs of angles representing relative displacement and relative orientation of pairs of geometric shapes in the subset (operation 120), wherein a given pair of angles (514, 516) for a given pair of geometric shapes (510, 512) in the subset includes: a first angle (514) at a location on a first geometric shape (510) in the given pair of geometric shapes (510, 512) between the first geometric shape (510) and a second geometric shape (512) in the given pair of geometric shapes (510, 512), and a second angle (516) at a location on the second geometric shape (512) between the second geometric shape (512) and the first geometric shape (510); and generating the at least one descriptor for the object (operation 122) by computing a 2-dimensional (2D) histogram (600) of the pairs of angles based on cells defined by angular quantization values.

A computer-program product for use in conjunction with a computer system (900), the computer-program product comprising a non-transitory computer-readable storage medium and a computer-program mechanism embedded therein, to generate at least one descriptor for an object, the computer-program mechanism including: instructions for receiving extracted geometric shapes aligned with edge pixels associated with the object in an image (operation 112); instructions for determining orientations for the geometric shapes (operation 116); instructions for identifying a subset of the geometric shapes (operation 118), wherein the subset includes k of the geometric shapes that are proximate to a given geometric shape (410) in the geometric shapes; instructions for calculating pairs of angles representing relative displacement and relative orientation of pairs of geometric shapes in the subset (operation 120), wherein a given pair of angles (514, 516) for a given pair of geometric shapes (510, 512) in the subset includes: a first angle (514) at a location on a first geometric shape (510) in the given pair of geometric shapes (510, 512) between the first geometric shape (510) and a second geometric shape (512) in the given pair of geometric shapes (510, 512), and a second angle (516) at a location on the second geometric shape (512) between the second geometric shape (512) and the first geometric shape (510); and instructions for generating the at least one descriptor for the object (operation 122) by computing a 2-dimensional (2D) histogram (600) of the pairs of angles based on cells defined by angular quantization values.

A computer system (900), comprising: a processor (91 O); memory (924); and a program module, wherein the program module is stored in the memory (924) and configurable to be executed by the processor (910) to generate at least one descriptor for an object, the program module including: instructions for receiving extracted geometric shapes aligned with edge pixels associated with the object in an image (operation 112); instructions for determining orientations for the geometric shapes (operation 116); instructions for identifying a subset of the geometric shapes (operation 118), wherein the subset includes k of the geometric shapes that are proximate to a given geometric shape (410) in the geometric shapes; instructions for calculating pairs of angles representing relative displacement and relative orientation of pairs of geometric shapes in the subset (operation 120), wherein a given pair of angles (514, 516) for a given pair of geometric shapes (510, 512) in the subset includes: a first angle (514) at a location on a first geometric shape (510) in the given pair of geometric shapes (510, 512) between the first geometric shape (510) and a second geometric shape (512) in the given pair of geometric shapes (510, 512), and a second angle (516) at a location on the second geometric shape (512) between the second geometric shape (512) and the first geometric shape (510); and instructions for generating the at least one descriptor for the object (operation 122) by computing a 2-dimensional (2D) histogram (600) of the pairs of angles based on cells defined by angular quantization values.

A computer-system-implemented method for generating at least one descriptor for an object, the method comprising: receiving extracted line segments aligned with edge pixels associated with the object in an image (operation 112); and using the computer system (900), generating the at least one descriptor for the object (operation 122) by computing a 2-dimensional (2D) histogram (600) of pairs of angles (514, 516) between pairs of the line segments (510, 512), wherein the 2D histogram (600) represents relative displacement and relative orientations of the pairs of line segments (510, 512); and wherein the 2D histogram (600) excludes lengths of the line segments.

A computer-program product for use in conjunction with a computer system (900), the computer-program product comprising a non-transitory computer-readable storage medium and a computer-program mechanism embedded therein, to generate at least one descriptor for an object, the computer-program mechanism including: instructions for receiving extracted line segments aligned with edge pixels associated with the object in an image (operation 112); and instructions for generating the at least one descriptor for the object (operation 122) by computing a 2-dimensional (2D) histogram (600) of pairs of angles (514, 516) between pairs of the line segments (510, 512), wherein the 2D histogram (600) represents relative displacement and relative orientations of the pairs of line segments (510, 512); and wherein the 2D histogram (600) excludes lengths of the line segments.

A computer system (900), comprising: a processor (910); memory (924); and a program module, wherein the program module is stored in the memory (924) and configurable to be executed by the processor (910) to generate at least one descriptor for an object, the program module including: instructions for receiving extracted line segments aligned with edge pixels associated with the object in an image (operation 112); and instructions for generating the at least one descriptor for the object (operation 122) by computing a 2-dimensional (2D) histogram (600) of pairs of angles (514, 516) 5 between pairs of the line segments (510, 512), wherein the 2D histogram (600) represents relative displacement and relative orientations of the pairs of line segments (510, 512); and wherein the 2D histogram (600) excludes lengths of the line segments.

An integrated-circuit-implemented method for generating at least one descriptor for an object, the method comprising: receiving extracted line segments aligned with edge pixels associated with the object in an image (operation 112); using the integrated circuit (1100), determining orientations for the line segments (operation 116); identifying a subset of the line segments (operation 118), wherein the subset includes k of the line segments that are proximate to a given line segment (410) in the line segments; calculating pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and generating the at least one descriptor for the object (operation 122) by computing a 2-dimensional (2D) histogram (600) of the pairs of angles based on cells defined by angular quantization values.

An integrated circuit (1100), comprising: an interface circuit (1110) configured to receive extracted line segments aligned with edge pixels associated with an object in an image (operation 112); an analysis circuit (1114), coupled to the interface circuit (1110), configured to: determine orientations for the line segments (operation 116); identify a subset of the line segments (operation 118), wherein the subset includes k of the line segments that are proximate to a given line segment (410) in the line segments; calculate pairs of angles representing relative displacement and relative orientation of pairs of line segments in the subset (operation 120), wherein a given pair of angles (514, 516) for a given pair of line segments (510, 512) in the subset includes: a first angle (514) at a location on a first line segment (510) in the given pair of line segments (510, 512) between the first line segment (510) and a second line segment (512) in the given pair of line segments (510, 512), and a second angle (516) at a location on the second line segment (512) between the second line segment (512) and the first line segment (510); and generate at least one descriptor for the object (operation 122) by computing a 2-dimensional (2D) histogram (600) of the pairs of angles based on cells defined by angular quantization values.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

The invention claimed is:

1. A computer-system-implemented method for generating at least one descriptor for an object, the method comprising:
   receiving extracted line segments aligned with edge pixels associated with the object in an image;
   determining orientations for the line segments;
   identifying a subset of the line segments, wherein the subset includes an integer number k of the line segments that are proximate to a given line segment in the line segments;
   using the computer system, calculating pairs of angles representing relative displacement and relative orientation of pairs of line segments in the subset, wherein a given pair of angles for a given pair of line segments in the subset includes: a first angle at a location on a first line segment in the given pair of line segments between the first line segment and a line t connected between the first line segment and a second line segment in the given pair of line segments, and a second angle at a location on the second line segment between the second line segment and the line; and
   generating the at least one descriptor for the object by computing a 2-dimensional (2D) histogram of the pairs of angles based on cells defined by angular quantization values.

2. The method of claim 1, wherein the method further comprises:
   receiving the image that includes the object; and
   extracting the line segments aligned with the edge pixels associated with the object.

3. The method of claim 1, wherein receiving the line segments includes accessing the line segments in a computer-readable memory.

4. The method of claim 1, wherein at least some of the line segments are not coupled to a remainder of the extracted line segments.

5. The method of claim 1, wherein the orientations are determined based on contrast polarity of the line segments.

6. The method of claim 1, wherein an orientation of the given line segment includes a direction aligned with the given line segment, and a sign computed by taking a cross product of a gradient at the location on the given line segment and the direction.

7. The method of claim 1, wherein the k line segments in the subset are nearest neighbors to the given line segment.

8. The method of claim 1, wherein, prior to determining the orientations, the method further comprises filtering the line segments based on lengths of the line segments and a threshold value.

9. The method of claim 1, wherein the location on the first line segment and the location on the second line segment include one of: midpoints of the first line segment and the second line segment; end points of the first line segment and the second line segment; and/or points on the first line segment and the second line segment separated by a minimum distance between the first line segment and the second line segment.

10. The method of claim 1, wherein calculating the given pair of angles includes an operation other than calculating a dot product between the first line segment and the second line segment.

11. The method of claim 1, wherein calculating the first angle includes rotating the first line segment clockwise over a connecting line segment that couples the first line segment and the second line segment; and
   wherein calculating the second angle includes rotating the second line segment clockwise over the connecting line segment.

12. The method of claim 1, wherein, for the given pair of angles, the 2D histogram of the pairs of angles includes weights in neighboring, adjacent cells to a cell that includes the given pair of angles;
   wherein the weights are determined using bilinear interpolation; and
   wherein a sum of the weights equals a constant.

13. The method of claim 1, wherein the method further comprises storing the 2D histogram of the pairs of angles in a computer-readable memory that includes a set of descriptors of objects; and
   wherein, for a given object, the set of descriptors includes at least one descriptor.

14. The method of claim 1, wherein the method further comprises generating a set of descriptors for the object by repeating the operations in the method for multiple subsets of the line segments.

15. The method of claim 1, wherein the method further comprises generating a set of descriptors for the object by repeating the operations in the method for multiple images of the object from different vantage points.

16. The method of claim 1, wherein the method further comprises generating a set of descriptors for the object by repeating the operations in the method for different values of k.

17. The method of claim 16, wherein the method further comprises:
    comparing the set of descriptors to a predefined set of descriptors associated with a second object, and
    identifying the object as the second object based on a group of matches in the comparisons.

18. The method of claim 17, wherein the object is identified as the second object without using lengths of the line segments in the comparison.

19. The method of claim 1, wherein the method further comprises associating at least a portion of the image with an object category based on an object classifier.

20. The method of claim 1, wherein the method further comprises:
    comparing the descriptor to predefined sets of descriptors that are associated with a set of objects; and
    identifying the object as one of the set of objects based on a group of match scores determined in the comparisons.

21. The method of claim 20, wherein the comparing includes:
    determining match scores between the descriptor and the predefined sets of descriptors based on Euclidean distances between the descriptor and the predefined sets of descriptors; and
    selecting a subset of matches based on the match scores using one of: a Generalized Hough Transformation and robust homography estimation.

* * * * *